(12) United States Patent
Bell et al.

(10) Patent No.: US 10,744,892 B2
(45) Date of Patent: Aug. 18, 2020

(54) SYSTEM AND METHOD FOR BATTERY CHARGING

(71) Applicant: Ford Global Technologies, LLC, Dearborn, MI (US)

(72) Inventors: David Bell, Plymouth, MI (US); Julia Helen Buckland, Commerce Township, MI (US); Tyler Kelly, Plymouth, MI (US); Timothy Stolzenfeld, Livonia, MI (US); Baitao Xiao, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 31 days.

(21) Appl. No.: 15/813,772

(22) Filed: Nov. 15, 2017

(65) Prior Publication Data
US 2019/0143821 A1    May 16, 2019

(51) Int. Cl.
*B60L 53/00*    (2019.01)
*B60L 53/10*    (2019.01)
*B60W 20/13*    (2016.01)
*B60W 10/06*    (2006.01)
*B60K 6/26*    (2007.10)
*B60K 6/44*    (2007.10)
(Continued)

(52) U.S. Cl.
CPC ............... *B60L 53/11* (2019.02); *B60K 6/26* (2013.01); *B60K 6/44* (2013.01); *B60L 7/10* (2013.01); *B60L 15/20* (2013.01); *B60L 50/15* (2019.02); *B60L 50/16* (2019.02); *B60L 50/61* (2019.02); *B60L 58/13* (2019.02); *B60W 10/06* (2013.01); *B60W 20/11* (2016.01);
*B60W 20/13* (2016.01); *B60L 2220/42* (2013.01); *B60L 2240/425* (2013.01); *B60L 2240/441* (2013.01); *B60L 2240/443* (2013.01); *B60L 2240/463* (2013.01); *B60L 2240/62* (2013.01); *B60L 2240/80* (2013.01); *B60L 2260/50* (2013.01); *B60W 2710/244* (2013.01)

(58) Field of Classification Search
CPC ... B60K 6/40; B60K 6/28; B60K 6/48; B60K 6/26; B60L 11/123; B60L 11/14; B60L 11/185; B60L 11/005; B60W 10/24; B60W 10/06; B60W 10/08
See application file for complete search history.

(56) References Cited

U.S. PATENT DOCUMENTS

| | | | |
|---|---|---|---|
| 5,906,098 A | | 5/1999 | Woollenweber et al. |
| 6,022,290 A | * | 2/2000 | Lyon ........................ B60K 6/12 477/108 |

(Continued)

FOREIGN PATENT DOCUMENTS

| | | |
|---|---|---|
| WO | 2005024202 A1 | 3/2005 |
| WO | 2014127298 A1 | 8/2014 |

*Primary Examiner* — Hau V Phan
(74) *Attorney, Agent, or Firm* — Geoffrey Brumbaugh; McCoy Russell LLP

(57) ABSTRACT

Methods and systems are provided for expediting charging of a battery before entry into a zero emissions zone. In one example, the battery is charged with a ratio of motor torque drawn from a first electric motor of an electric turbocharger and a second electric motor of an HEV driveline. The ratio is coordinated with adjustments to an exhaust waste-gate and an intake throttle so as to maintain operator torque demand and propel the vehicle while charging the battery.

19 Claims, 5 Drawing Sheets

(51) Int. Cl.
  *B60W 20/11* (2016.01)
  *B60L 7/10* (2006.01)
  *B60L 58/13* (2019.01)
  *B60L 15/20* (2006.01)
  *B60L 50/61* (2019.01)
  *B60L 50/16* (2019.01)
  *B60L 50/15* (2019.01)

(56) References Cited

U.S. PATENT DOCUMENTS

| | | | |
|---|---|---|---|
| 6,705,084 B2 | 3/2004 | Allen et al. | |
| 6,735,945 B1 | 5/2004 | Hall et al. | |
| 6,931,850 B2 | 8/2005 | Frank et al. | |
| 7,640,744 B2* | 1/2010 | Rollinger | B60L 11/14 |
| | | | 60/605.1 |
| 7,779,634 B2 | 8/2010 | Barthelet et al. | |
| 8,371,121 B2 | 2/2013 | Godeke et al. | |
| 8,596,390 B2 | 12/2013 | Soliman et al. | |
| 8,991,172 B2* | 3/2015 | Shimizu | F02B 37/10 |
| | | | 290/40 R |
| 9,200,556 B2* | 12/2015 | Wong | B60W 20/13 |
| 9,500,124 B2* | 11/2016 | Ge | F02B 61/06 |
| 9,789,756 B2* | 10/2017 | Schwartz | B60K 6/28 |
| 2001/0039230 A1* | 11/2001 | Severinsky | B60H 1/004 |
| | | | 477/3 |
| 2007/0208467 A1* | 9/2007 | Maguire | B60K 6/48 |
| | | | 701/22 |
| 2010/0051363 A1 | 3/2010 | Inoue et al. | |
| 2011/0137537 A1* | 6/2011 | Leone | F02D 41/0027 |
| | | | 701/102 |
| 2011/0270511 A1* | 11/2011 | Kurtz | F02D 29/06 |
| | | | 701/105 |
| 2012/0304962 A1* | 12/2012 | Tumelaire | F02D 41/1497 |
| | | | 123/349 |
| 2017/0349164 A1* | 12/2017 | Miller | B60K 6/40 |
| 2018/0171913 A1* | 6/2018 | Ulrey | F01N 3/20 |

* cited by examiner

SYSTEM AND METHOD FOR BATTERY CHARGING

FIELD

The present description relates generally to methods and systems for controlling a state of charge of a system battery in a hybrid electric vehicle.

BACKGROUND/SUMMARY

Many areas in the world have implemented varying degrees of Low Emissions Zones (LEZ) including Zero Emissions Zones (ZEZ). As an example, in some locations, older busses and trucks that do not meet certain emissions standards are not allowed. In still other locations, vehicles with internal combustion engines are not allowed, and hybrid vehicles are allowed only if operating in an electric-only mode with the internal combustion engine off.

There may be circumstances when a vehicle is entering or passing through such an area (e.g., LEZ or ZEZ) where the vehicle batteries are not at the optimum level to get to the destination and back, or even to pass through the area. For example, there may not be sufficient margin around the estimated energy needs. Even if an engine driven battery charging device is available on-board the vehicle, it may be difficult to charge the battery as rapidly as required when operating the vehicle in such an area.

The inventors herein have recognized that the motor of an electrically assisted boosted engine system may be used to address the above issue. In particular, boosted engine systems may be provided with electric machines to provide electrical assistance, such as an electric motor/generator coupled to a turbocharger. The motor can drive the supercharger compressor or the turbocharger shaft to improve transient boost pressure delivery during a tip-in event. During conditions when rapid battery charging is required, such as just before entering a ZEZ, a turbocharger may be run at a higher power than necessary while the electric motor is operated in a recuperating mode to charge the system battery, or other energy storage device, at a faster rate than would otherwise be possible. In addition to expediting battery charging, an energy recuperation potential of the motor/generator is increased. Further still, the operation of the electric motor of the boosted engine system can be coordinated with the operation of an electric motor coupled to the driveline of the hybrid electric vehicle (such as a starter-motor) to charge the battery while meeting the driver torque demand.

In one example, rapid battery charging may be enabled by a method for a hybrid vehicle having a boosted engine, comprising: responsive to anticipated vehicle operation in a low emission zone, charging a system battery via at least one of a first electric motor coupled to a turbocharger shaft and a second electric motor coupled to a vehicle driveline, the charging of the system battery completed before the vehicle enters the zero emission zone. The same approach may also be applied during conditions when engine-driven battery charging is not available, such as when an alternator is degraded.

As one example, while a hybrid electric vehicle is propelled using engine torque, a vehicle controller may predict that vehicle travel through a low emissions zone (LEZ) is upcoming based on input from a navigational system. The controller may then calculate an amount and rate of charge transfer required to the system battery to enable the vehicle to be propelled using motor torque when in the LEZ. For example, based on a current state of charge (SOC) of the battery, and further based on a distance or duration of travel (from a current location) before entering the LEZ, as well as a distance or duration to be traveled while in the LEZ, the controller may calculate a target SOC for the battery. An amount and rate of charge transfer may then be determined in accordance. To enable the expedited charging of the battery, motor torque from one or both of a first electric motor that is coupled to a turbocharger of the vehicle system, and a second electric motor coupled to a driveline of the vehicle system, may be applied. For example, based on current engine speed-load conditions, which vary with operator torque demand, the controller may vary the ratio of negative motor torque applied to charge the battery, while using concurrent waste-gate and intake throttle adjustments to maintain wheel torque based on the operator torque demand. For example, during conditions when boosted engine operation with electric assistance from the first electric motor is not required, the boost request may be increased in excess of the operator torque demand, thereby closing the waste-gate more than required, and the excess turbocharger torque may be used to charge the battery via the first electric motor. As another example, during conditions when there is a drop in torque demand, boost pressure may be decreased by absorbing torque from the turbocharger shaft and using it to charge the battery via the first motor, while also absorbing wheel torque and using it to charge the battery via the second motor. A ratio of torque absorbed at the first motor relative to the second motor may be adjusted based on overall system needs (such as by absorbing more torque via the first motor when the drop in torque demand is larger) as well as motor conditions (such as by absorbing more torque via the first motor when a temperature of the second motor is higher than its optimal value).

In this way, by working the turbocharger harder than required for the requested vehicle tractive effort, a system battery can be charged faster than would otherwise be possible. The technical effect of varying the ratio of motor torque drawn from an electric assist motor and a hybrid vehicle driveline electric motor to charge the battery is that a target SOC can be achieved while continuing to provide driver demanded torque. By charging the battery before entering a low emissions zone, emissions compliant vehicle operation in the low emissions zone can be enabled. By also charging the battery using motor torque from the electric assist motor during conditions when an alternator is degraded, a minimum battery charge can be maintained at all times, improving the performance of a hybrid electric vehicle.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
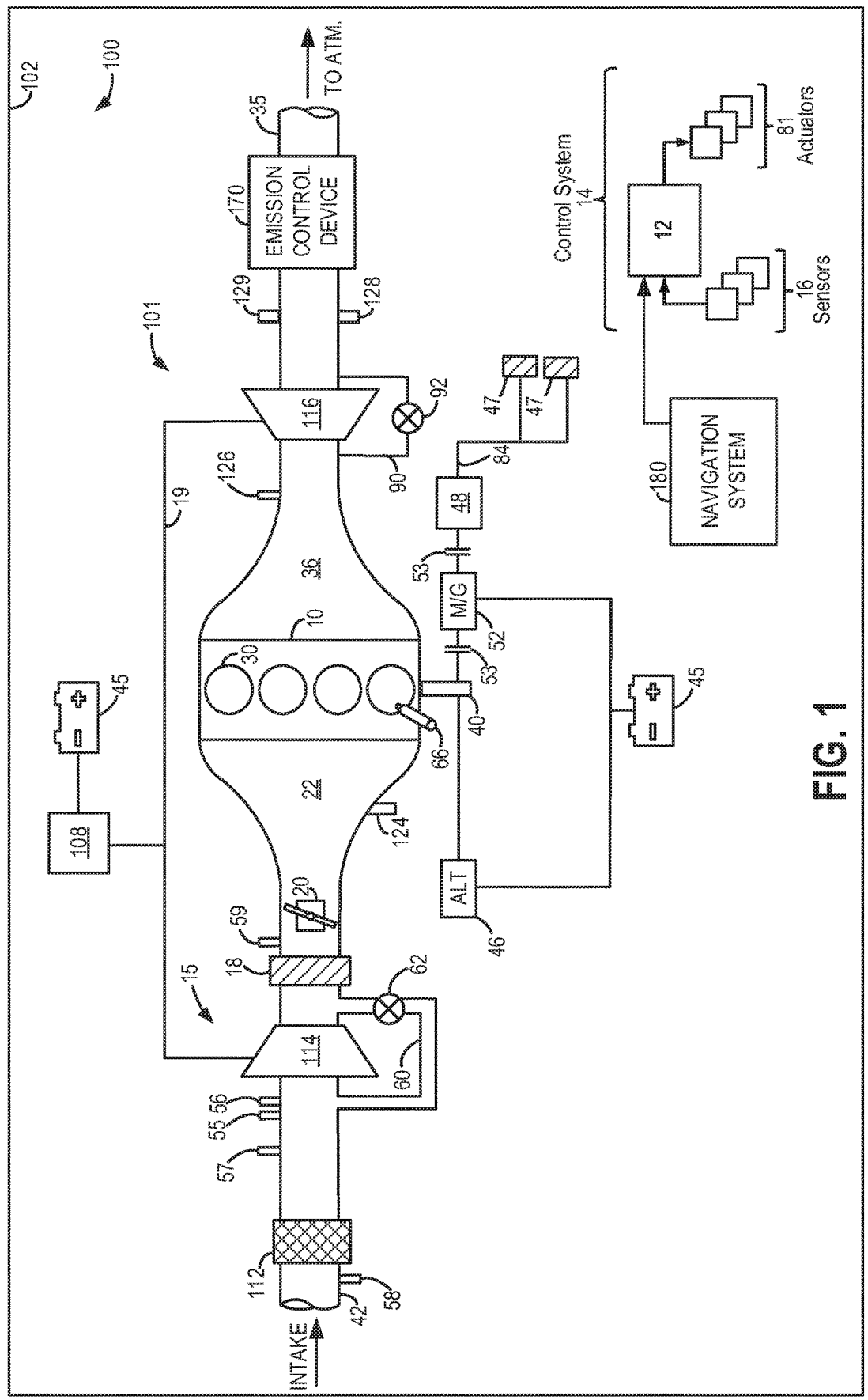
FIG. 1 shows an example embodiment of a boosted engine system configured with electric assistance.

The following description relates to systems and methods for management of battery state of charge in a hybrid vehicle system having an engine with a boosting device that is configured with electric assistance from an electric motor. One non-limiting example of such a system is shown in FIG. 1, wherein an electric turbocharger is provided in a hybrid electric vehicle. An engine controller may be configured to perform a control routine, such as the example routine of FIGS. 2 and 4, to operate the vehicle system in one of a plurality of operating modes (tabulated at FIG. 3) responsive to an expedited battery charging requirement and further based on operating conditions at the time of charging. Based on the selected operating mode, the controller may use one or more of an electric motor of the electric boosting device and an electric motor of the vehicle's driveline to charge the battery. A prophetic example of coordinating electric assist motor and HEV motor operation during vehicle operation in a low emissions zone is shown in FIG. 5.

FIG. 1 schematically shows aspects of an example hybrid vehicle system 100, including an engine system 101 having an engine 10 coupled in a vehicle 102. In the depicted example, vehicle 102 is a hybrid electric vehicle with multiple sources of torque available to one or more vehicle wheels 47. In the example shown, a powertrain of vehicle 102 includes engine 10 and an electric machine 52. Electric machine 52 may be a motor or a motor/generator. Engine 10 and electric machine 52 are connected to vehicle wheels 47 via a transmission 48 when one or more clutches 53 are engaged. In the depicted example, a (first) clutch 53 is provided between engine 10 and electric machine 52, and a (second) clutch 53 is provided between electric machine 52 and transmission 48. A controller 12 may send a signal to an actuator of each clutch 53 to engage or disengage the clutch, thereby connecting or disconnecting engine 10 from electric machine 52 and the components connected thereto and/or connecting or disconnecting electric machine 52 from transmission 48 and the components connected thereto. For example, torque from engine 10 may be transferred to vehicle wheels 47 via a crankshaft 40, transmission 48, and a powertrain shaft 84 when clutches 53 are engaged. Transmission 48 may be a gearbox, a planetary gear system, or another type of transmission. Transmission 48 may be a fixed ratio transmission that includes a plurality of gear ratios to allow engine 10 to rotate at a different speed than wheels 47. By changing a torque transfer capacity of first clutch 53 (e.g., an amount of clutch slippage), an amount of engine torque relayed to the wheels via powertrain shaft 84 may be modulated.

Electric machine 52 may be an HEV motor coupled in the drivetrain between the engine and the transmission. In still other examples, electric machine 52 may be a crankshaft integrated starter/generator (CISG). The CISG may be coupled to an output shaft of the engine so that during a startup of the hybrid vehicle system, the CISG may provide torque to turn the engine to facilitate startup of the engine. Under some conditions, the CISG may supply torque output to supplement or replace engine torque. Further, as elaborated herein, under some conditions, the CISG may supply negative torque output (that is, absorb driveline torque) that may be converted into electric energy, such as for charging a system battery.

The powertrain may be configured in various manners, including as a parallel, a series, or a series-parallel hybrid vehicle. In electric vehicle embodiments, a system electrical energy device, such as system battery 45 may be coupled to the driveline. System battery 45 may be a traction battery that delivers electrical power to electric machine 52 to provide torque to vehicle wheels 47. In some embodiments, electric machine 52 may also be operated as a generator to provide electrical power to charge system battery 45, for example, during a braking operation. It will be appreciated that in other embodiments, including non-electric vehicle embodiments, system battery 45 may be a typical starting, lighting, ignition (SLI) battery coupled to an alternator 46.

It will be appreciated that while the system electrical energy storage device 45 is depicted herein as a battery, in other examples, the electrical energy storage device 45 may be a capacitor.

Alternator 46 may be configured to charge system battery 45 using engine torque drawn from the crankshaft during engine running. In addition, alternator 46 may power one or more electrical systems of the engine, such as one or more auxiliary systems including a heating, ventilation, and air conditioning (HVAC) system, vehicle lights, an on-board entertainment system, and other auxiliary systems based on their corresponding electrical demands. In one example, a current drawn on the alternator may continually vary based on each of an operator cabin cooling demand, a battery charging requirement, other auxiliary vehicle system demands, and motor torque. A voltage regulator may be coupled to alternator 46 in order to regulate the power output of the alternator based upon system usage requirements, including auxiliary system demands. As elaborated herein, during conditions when the alternator is degraded, battery charging may be enabled via one or more of electric machine 52 and electric assist motor 108.

In the depicted embodiment, engine 10 is a boosted engine configured with turbocharger 15. Turbocharger 15 includes compressor 114 that is mechanically coupled to, and driven by, turbine 116 via a shaft 19, the turbine 116 driven by expanding engine exhaust. In one embodiment, the turbocharger may be a twin scroll device. In another embodiment, the turbocharger may be a variable geometry turbocharger (VGT), wherein turbine geometry is actively varied as a function of engine operating conditions. Turbocharger 15 may be further configured as an electric turbocharger having an electric motor 108 (herein also referred to as an electric assist motor) configured to provide electric assistance to the compressor, turbine, or turbocharger shaft. In the depicted example the electric motor 108 is coupled to shaft 19 although in other examples, the electric motor may be selectively coupled to the compressor 114 or the turbine 116. Electric motor 108 may be powered by an on-board energy storage device, such as system battery 45. Electric motor 108 may be additionally or alternatively powered by alternator 46. An amount of electrical power delivered to electric motor 108 may be varied in order to adjust the output of the turbocharger. In one example, the amount of electric power delivered to electric motor 108 may be increased to increase the speed of compressor 114. As a result of the electrical assistance, compressor 114 of turbocharger 15 may be rapidly spun up, reducing turbo lag. As elaborated with reference to FIG. 2, during selected conditions, electric motor 108 may also be used to charge system battery 45. For example, turbocharger turbine output may be increased over that required to meet the driver torque demand while negative torque is output from the electric motor 108 that may be converted into electric energy for charging battery 45. In still another example, the charging of the system battery may be performed by coordinating the negative torque output from electric motor 108 and electric machine 52.

It will be appreciated that while the depicted example shows the turbocharger configured with electric assistance, this is not meant to be limiting. In still further examples, the engine may be a compound boosted engine system having an electric supercharger or other boost generating device upstream or downstream of the turbocharger in the engine intake. The turbocharger 15 may or may not be configured to receive from electric assistance from electric motor 108. In this case, the electric motor powering the supercharger or other boost device may also be used to brake the compressor and recharge the battery as described.

Electric motor 108 may be configured as a motor-generator. Thus, during conditions when electric assistance is required for boost build-up, the electric motor may provide positive torque to drive the centrifugal compressor of the turbocharger shaft, to improve the transient boost pressure delivery. However, the electric motor is also capable of energy recuperation by "braking" the motor shaft. Therein, negative torque may be applied to the compressor (or shaft), reducing the compressor speed and concurrently charging the system battery (such as battery 45) coupled to the motor. As elaborated with reference to FIG. 2, an engine controller may control a timing and amount of negative torque applied from the electric motor to charge the system battery during selected conditions. Using the electric motor in a recuperating energy mode (absorbing) can help charge the system battery faster, and/or maintain the state of charge at a higher level, when the need arises.

Fresh air is introduced along intake passage 42 into engine 10 via air box 112 and flows to compressor 114. Air is then compressed at compressor 114 and introduced into engine 10. Air compressed by turbocharger 15 may also be recirculated from an outlet to an inlet of compressor 114 through a compressor recirculation passage 60 by adjusting an opening of a compressor recirculation valve (CRV) 62. CRV 62 may be a continuously variable valve, or possibly a variable discrete valve and increasing the opening of the CRV 62 may include actuating (or energizing) a solenoid of the valve if discrete or a motor controller such as an H-Bridge if continuous.

Compressor 114 is coupled to a throttle valve 20 through a charge-air cooler (CAC) 18 (also referred to as an intercooler herein). Air flows from compressor 114 through CAC 18 and throttle valve 20 to an intake manifold 22. CAC 18 may be an air-to-air or water-to-air heat exchanger, for example. Intake manifold pressure (e.g., a pressure of the air charge within the intake manifold) may be determined using a manifold absolute pressure (MAP) sensor 124.

Intake manifold 22 is coupled to a series of combustion chambers 30 through a series of intake valves (not shown). The combustion chambers are further coupled to an exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system. Likewise, configurations having a plurality of intake manifold sections may enable air sourced from different locations to be directed to different combustion chambers of the engine system (usually cylinder banks). Further, the intake manifold may have multiple intake throttles (such as one per bank).

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted for the desired combustion and emissions-control performance. For example, the cam timing may be adjusted via a variable cam timing system to move the intake and exhaust cams to a position that provides the optimal volumetric efficiency for the given operating conditions.

In some embodiments, the engine may also be configured for selective cylinder deactivation, wherein individual cylinder valve operation may be selectively deactivated via individual cylinder valve mechanisms (including intake and exhaust valve cams), and individual cylinder fueling may be selectively deactivated via deactivatable fuel injectors.

Combustion chambers 30 may be supplied one or more fuels, such as gasoline, alcohol fuel blends, diesel, biodiesel, compressed natural gas, etc. Fuel may be supplied to the combustion chambers via direct injection, port injection, throttle valve-body injection, or any combination thereof. In the depicted example, fuel is provided to each combustion chamber 30 via direct injection by a fuel injector 66 (while only one fuel injector is shown in FIG. 1, each combustion chamber includes a fuel injector coupled thereto). Fuel may be delivered to fuel injector 66 by a fuel system (not shown) including a fuel tank, a fuel pump, and a fuel rail. In the combustion chambers, combustion may be initiated via spark ignition and/or compression ignition.

As shown in FIG. 1, exhaust from exhaust manifold 36 is directed to turbine 116 to drive the turbine. When reduced turbine torque is desired, a portion of exhaust may be directed instead through a waste-gate 90, bypassing the turbine. A waste-gate actuator 92 (e.g., waste-gate valve) may be actuated open to relieve at least some exhaust pressure from upstream of turbine 116 to a location downstream of turbine 116 via waste-gate 90. By reducing exhaust pressure upstream of turbine 116, turbine speed may be reduced.

The combined flow from turbine 116 and waste-gate 90 flows through an emission control device 170. In general, emission control device 170 may include one or more exhaust after-treatment components configured to reduce an amount of one or more substances in the exhaust flow. For example, one exhaust after-treatment component may be configured to trap NO, from the exhaust flow when the exhaust flow is lean and to reduce the trapped NO, when the exhaust flow is rich. In other examples, an exhaust after-treatment component may be configured to disproportionate NO, or to selectively reduce NO, with the aid of a reducing agent. In still other examples, emission control device 170 includes a three-way catalyst configured to oxidize residual hydrocarbons and carbon monoxide while reducing NO, in the exhaust flow. Different exhaust after-treatment catalysts having any such functionality may be arranged in wash coats or elsewhere in emission control device 170, either separately or together. In some embodiments, the emission control device 170 may further include a regeneratable soot filter configured to trap and oxidize soot particles in the exhaust flow.

All or part of the treated exhaust from emission control device 170 may be released into the atmosphere via an exhaust conduit 35. Depending on operating conditions, however, some exhaust may be diverted instead to intake passage 42 via an exhaust gas recirculation (EGR) passage (not shown), including an EGR cooler and an EGR valve. EGR may be recirculated to the inlet of compressor 114.

One or more sensors may be coupled to the inlet of compressor 114. For example, a temperature sensor 55 may be coupled to the inlet of compressor 114 for estimating a compressor inlet temperature. As another example, a pressure sensor 56 may be coupled to the inlet of compressor 114 for estimating a pressure of air entering the compressor. Still other sensors may include, for example, air-fuel ratio sensors, humidity sensors, etc. In other examples, one or more of the compressor inlet conditions (such as humidity, temperature, etc.) may be inferred based on engine operating conditions. The sensors may estimate a condition of the intake air received at the compressor inlet from the intake passage as well as the air charge recirculated from upstream of CAC 18. One or more sensors may also be coupled to intake passage 42 upstream of compressor 114 for determining a composition and condition of air charge entering the compressor. These sensors may include, for example, a pressure sensor 58. In addition, a throttle inlet pressure (TIP) sensor 59 may be coupled downstream of CAC 18 and upstream of throttle valve 20 for estimating a boost pressure delivered to the engine, as measured by TIP sensor 59.

During an operator tip-in event, when going from engine operation without boost to engine operation with boost responsive to an increase in operator torque demand, turbo lag can occur. This is due to delays in turbine 116 spin-up due to the turbocharger being a slower-acting compression device. The same may also occur when the engine is operating boosted and there is a transient increase in boost demand due to an increase in accelerator pedal application by the vehicle operator. To reduce this turbo lag, during those selected conditions, turbocharger 15 may be electrically assisted by receiving positive torque from electric motor 108. Therein, the electric motor may add torque to the turbocharger shaft connecting the turbine to the compressor. Alternatively, when a supercharger is included in the configuration, turbo lag may be reduced by electrically enabling the supercharger using positive torque received from electric motor 108.

During an operator tip-out event, when going from engine operation with boost to engine operation without boost (or reduced boost), compressor surge may occur. This is due to a decreased flow through the compressor 114 when throttle valve 20 closes at the tip-out. The reduced forward flow through the compressor can cause surge and degrade turbocharger performance. In addition, surge can lead to noise, vibration, and harshness (NVH) issues such as undesirable noise from the engine intake system. To enable the torque demand to be rapidly reduced responsive to the tip-out without incurring compressor surge during a default mode of vehicle operation, at least a portion of the air charge compressed by compressor 114 may be recirculated to the compressor inlet. This increases compressor flow rate to move operation away from the surge region. In particular, CRV 62 may be opened to recirculate (warm) compressed air from the outlet of compressor 114, upstream of CAC 18, to the inlet of compressor 114. In some embodiments, the compressor recirculation system may additionally or alternatively include a recirculation passage for recirculating cooled compressed air from downstream of CAC 18 to the inlet of compressor 114. In addition, waste-gate actuator 92 may be moved to a more open (e.g., fully open) position so that more of the exhaust flow travels to the tailpipe while bypassing the turbine, thereby expediting turbine spin-down.

Vehicle system 100 may further include a navigation system 180 communicatively coupled to controller 12. The navigation system may include, for example, a GPS device. Based on input from a vehicle operator regarding a desired destination, the navigation system 180 may provide route details from the point of origin to the desired destination. In addition, traffic information along the route, as well as weather details of the destination may be provided.

In still further examples, the navigation system 180 may indicate if the destination is in a low emissions zone (LEZ), such as a zero emissions zone (ZEZ), or if the vehicle route passes through the LEZ. The LEZ may be a geographic zone where vehicle propulsion using engine operation is not allowed. In particular, only hybrid vehicles that meet predefined emissions standards are allowed. The LEZ may be a geographic zone defined by latitude and longitude or other geographical coordinates. The coordinates of the LEZ may define a region with a continuous boundary enclosing the entire LEZ. A non-LEZ may be fully outside those coordinates and may fully surrounding the boundary of the LEZ. In some examples, the boundary of the LEZ may operate 24 hours a day, 7 days a week, and may be marked by appropriate road signs. In other examples, the LEZ may be a region that is operated as an LEZ during selected hours and as a non-LEZ during other hours. The navigation system 180 may identify the LEZ based on geographic coordinates of the zone relative to the coordinates of the selected travel route and destination.

The inventors have recognized that there may be numerous conditions where a system battery, such as battery 45, is not at as high of a level of charge as desired. These may include, for example, periods of vehicle operation where electrical energy usage has been exceptionally high, charging infrastructure was not readily available prior to commencing a trip, the vehicle was used to power a load without being run or otherwise charged, or the vehicle is nearing an area in which engine operation is limited or inhibited (such as an LEZ). In such a situation, the electric motor 108 of the boosting system can be used in a recuperation mode to return additional energy to the battery beyond what the normal engine driven charging device is capable of doing. In the recuperation mode, the motor which is normally used in driving the turbocharger compressor, is operated in an absorbing mode where it absorbs energy from the output side of the boosting device minus electrical losses, and returns the energy to the battery system. This is achieved by running the turbocharger turbine at a higher state of load than would be necessary for current load conditions, with the extra energy being used for the recharging. In addition, the battery may be charged with a split ratio of torque from electric motor 108 and electric machine 52 to expedite charging. The split ratio may be adjusted based on operator torque demand at the time of the charge transfer, as well as motor conditions such as temperature and speed of each motor.

Controller 12 may be included in a control system 14. Controller 12 is shown receiving information from a plurality of sensors 16 (various examples of which are described herein) and sending control signals to a plurality of actuators 81 (various examples of which are described herein). As one example, sensors 16 may include an exhaust gas sensor 126 located upstream of turbine 116, MAP sensor 124, an exhaust temperature sensor 128, an exhaust pressure sensor 129, compressor inlet temperature sensor 55, compressor inlet pressure sensor 56 (e.g., for measuring $P_1$), a mass air flow (MAF) sensor 57, pressure sensor 58 and TIP sensor 59. Other sensors, such as additional pressure, temperature, air/fuel ratio, and composition sensors, may be coupled to various locations in vehicle system 100. The actuators 81 may include, for example, throttle valve 20, CRV 62, electric motor 108, waste-gate actuator 92, and fuel injector 66. Controller 12 may receive input data from the various sensors, process the input data, and employ the various actuators to adjust engine operation based on the received signals and instructions stored on a memory of the controller. The controller may employ the actuators in response to the processed input data based on instruction or code programmed therein corresponding to one or more routines, such as example control routines described herein with regard to FIG. 2 (and FIG. 4). As an example, responsive to a lower than threshold state of charge of battery 45, and the need for expedited battery charging, the engine may be operated to provide an output turbine energy in excess of that required to meet the operator torque demand, while electric motor 108 is operated as a generator to charge battery 45 using the extra torque drawn via the turbocharger shaft 19.

In this way, the components of FIG. 1 enable a hybrid vehicle system comprising an engine; a turbocharger coupled to an engine intake, the turbocharger including an intake compressor coupled to an exhaust turbine via a shaft, and a first electric motor coupled to the shaft for providing electric assistance to the turbocharger; a second electric motor coupled to a vehicle driveline between the engine and a transmission; a waste-gate including a waste-gate actuator coupled across the exhaust turbine of the turbocharger; an intake throttle coupled to the engine intake; a system battery coupled to each of the first and the second electric motor; a navigational system; and a controller. The controller may be configured with computer readable instructions stored on non-transitory memory for, responsive to input from the navigational system, operating the vehicle system in a first charging mode with the first electric motor disabled and with the battery charged using motor torque drawn from the second electric motor; operating the vehicle system in a second charging mode with the first electric motor providing motor torque to the turbocharger and with the battery charged using motor torque drawn from the second electric motor; operating the vehicle system in a third charging mode with the battery charged using motor torque drawn from each of the first and the second electric motor; operating the vehicle system in a fourth charging mode with the second electric motor disabled and the battery charged using motor torque drawn from the first electric motor; and selecting a charging mode based on operator torque demand and the input from the navigational system. In one example, the input from the navigational system includes an amount of charge transfer to the battery required for vehicle travel through an upcoming zero emissions zone, the vehicle propelled without engine torque through the upcoming zero emissions zone. As a further example, the selecting may include selecting the first charging mode when engine speed is lower than a threshold speed and engine load is lower than a threshold load; selecting the second charging mode when engine speed is lower than the threshold speed and engine load is lower than the threshold load; selecting the third charging mode when engine speed is higher than the threshold speed and engine load is higher than the threshold load by a first amount; and selecting the fourth charging mode when engine load is higher than the threshold load by a second amount, larger than the first amount. Herein, while operating in any of the first, second, third, and fourth charging modes, the vehicle is propelled, at least in part, using engine torque. The controller may include further instructions for reducing an opening of the waste-gate actuator further when the battery is charged using motor torque drawn from the first electric motor relative to when the first electric motor is providing motor torque to the turbocharger; and reducing an opening of the intake throttle responsive to the reducing the opening of the waste-gate actuator. In other examples, when increasing turbine torque to charge the battery via regeneration, the controller may maintain the opening of the intake throttle. Further still, one or more other engine operating parameters may be adjusted via signals commanded to corresponding actuators. For example, engine operating settings may be changed via actuation of camshafts, throttles, etc.

Figure 2:
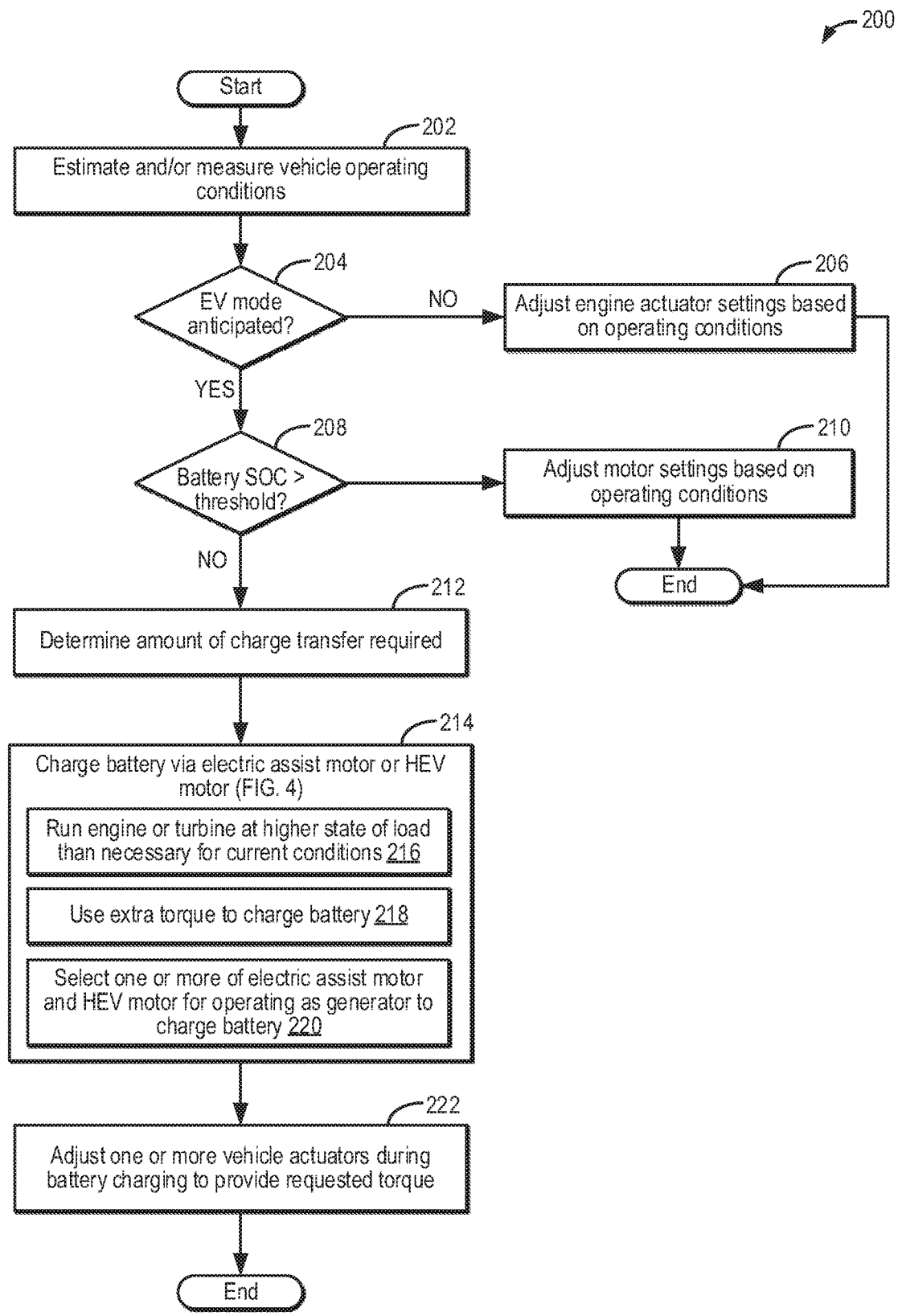
FIG. 2 depicts a high-level flow chart for charging a system battery of a hybrid electric vehicle via the boosted engine system of FIG. 1.

Turning now to FIG. 2, method 200 depicts an example routine for charging a battery of a hybrid vehicle system using torque drawn from one or more of an electric turbocharger motor and a vehicle system motor. The method enables the battery to be charged faster than would otherwise be possible. Instructions for carrying out method 200 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 202, the method includes estimating and/or measuring vehicle and engine operating conditions. These include, for example, vehicle speed, operator torque demand, engine speed, a battery state of charge (SOC), ambient conditions such as ambient temperature, pressure, and humidity, MAF, MAP, etc.

At 204, the method includes determining if an electric mode of vehicle operation is anticipated or predicted. In one example, the electric mode may be anticipated responsive to the vehicle entering or approaching a low emissions or zero emissions zone (LEZ, or ZEZ) where engine operation is limited (or inhibited) and where hybrid vehicles are required to be operated in an electric mode. Other conditions where an electric mode of vehicle operation may be anticipated include a prolonged period of vehicle operation where electrical energy usage has been exceptionally high such as long periods of start and stop driving in heavy traffic or congestion, charging infrastructure not being readily available prior to commencing a drive cycle, such as when a charging station is not available within a radius of the departure point, the vehicle being used to power a load (e.g., a power take-off load) without being run or otherwise charged, or an alternator of the vehicle being degraded. By charging the battery when the alternator is degraded, the range of the vehicle can be extended, enabling the turbocharger motor to act as a back-up alternator. While the charged battery would not be able to provide sustained operation at high loads, it could be used for a limited amount of time, improving the range of the vehicle.

In one example, the vehicle controller may communicate with a navigation system of the vehicle (e.g., GPS) to predict the upcoming electric mode of operation. For example, if the vehicle destination indicated by the vehicle operator, or a route selected by the vehicle operator, enters or passes through an LEZ, the controller may anticipate an upcoming electric mode of operation. Likewise, if there is a change in vehicle route, such as due to construction, or a discrete event, where the change in vehicle route (e.g., detour or rerouting) causes the vehicle to travel (e.g., transiently) through an LEZ, the controller may anticipate an upcoming electric mode of operation. In another example, the electric mode of operation may be selected by the vehicle operator, such as by actuating a mode switch or button. In still other examples, an upcoming electric mode of operation may be anticipated whenever the vehicle is headed in the direction of, or parallel to, an LEZ.

As such, the LEZ may be defined by specific geographic coordinates and may define a region where vehicle propulsion via an internal combustion engine is not allowed. As an example, a boundary of the LEZ may be defined by longitudinal and latitudinal markers and the LEZ may be fully contained within those markers. Further, the boundary of the LEZ may be surrounded by a non-LEZ where vehicle propulsion via an internal combustion engine is allowed.

If an electric vehicle mode is not anticipated, at 206, the method includes adjusting engine actuator settings based on engine operating conditions while continuing to operate the vehicle in the engine mode. For example, responsive to an increase in operator torque demand while operating in the engine mode, the controller may enable boost by closing the waste-gate valve. In addition, further boost pressure may be provided using electrical assistance, such as operating an electric motor coupled to the turbocharger shaft to reduce turbo lag. The method then exits.

If an electric vehicle mode is anticipated, at 208, the method includes determining if the battery SOC is higher than a threshold. The threshold may correspond to a defined state of charge that enables the vehicle to be propelled for at least a minimum duration or distance in the electric mode. In one example, the threshold is a predefined calibrated threshold that is required for an electric mode to be enabled, such as 30% SOC. In another example, the threshold is adjusted dynamically based on one or more parameters related to the trip through the LEZ. For example, the threshold may be adjusted based on an expected duration or distance of travel through the LEZ, the threshold increased as the expected duration or distance of travel increases.

In one example, the controller may calculate an amount and rate of charge transfer required to pass through the LEZ based on the current geographic location relative to the location of the LEZ, and further based on the duration or distance of travel expected through the LEZ. The threshold SOC may then be determined as a function of the calculated amount of charge transfer. For example, a distance of the LEZ relative to the current location may be input into a look-up table and an amount of charge transfer as well as a corresponding threshold SOC may be output. In other examples, the threshold SOC may be determined via an algorithm, model, or other function based on the location of the LEZ relative to the current location.

If the battery SOC is higher than the threshold, then at 210, it may be inferred that the vehicle can passage through the LEZ in the electric mode without requiring operation of the internal combustion engine. Accordingly, one or more motor settings may be adjusted based on the vehicle operating conditions. For example, a timing of transitioning from vehicle propulsion using engine torque to vehicle propulsion using motor torque may be adjusted based on a duration/distance to the LEZ. In addition, motor torque output may be adjusted during the travel through the LEZ, such as based on road grade, operator torque demand, and requested vehicle speed.

If the battery SOC is lower than the threshold, then at 212, the method includes determining the amount of charge transfer required. This includes determining a sum of the amount of charge required during the upcoming trip through the LEZ as well as an amount of charge required to move the current SOC to the threshold SOC. For example, the amount and rate of charge transfer required to pass through the LEZ may be determined based on the current geographic location relative to the location of the LEZ, and further based on the duration or distance of travel expected through the LEZ.

At 214, the method includes charging the system battery to the threshold SOC via a ratio of motor torque from the electric assist motor (such as the electric motor providing electric assistance to the electric turbocharger) and the electric motor of the HEV (such as the CISG motor, also referred to as the starter motor) or the electric motor coupled in the driveline between the engine and the transmission (also referred to herein as the HEV motor). Charging the battery using electric assist from the electric motors may include, at 216, running the engine and/or turbine at a torque output than necessary for the current operating conditions, and at 218, using the extra torque to charge the battery via the motor(s). At 220, the charging further includes selecting one or more of the electric assist motor and the HEV motor for operating in a generator (or energy recuperation) mode to charge the battery. As elaborated at FIG. 4, based on factors such as motor temperature, motor speed, engine speed and load, the controller may select an operating mode that enables the battery to be charged expediently while continuing to meet the operator torque demand. For example, based on operating conditions, the controller may charge the battery via the electric assist motor by generating turbine torque in excess of that required to meet the operator torque demand and then absorbing the excess torque via the electric assist motor to charge the battery. As another example, the controller may charge the battery via the driveline motor by absorbing excess wheel torque during deceleration and downhill travel to charge the battery. As still another example, the controller may charge the battery via each of the assist motor and the driveline motor.

At 222, after selecting an operating mode and enabling the selected mode, the method includes adjusting one or more vehicle actuators during the battery charging operation to provide the operator requested torque and any tractive demands. For example, while charging the battery via the electric assist motor, one or more of an exhaust waste-gate and an intake throttle opening may be adjusted to enable a net wheel torque (torque delivered via the engine and/or the motor to the vehicle wheels) to be maintained at a level based on the operator torque demand while providing the appropriate amount of excess engine and/or turbine torque to charge the battery with either the electric assist motor or the HEV driveline motor or both as conditions require. For example, the exhaust waste-gate opening may be reduced more than required to meet the boost demand and generate excess turbine torque which is then used to increase the ratio of torque absorbed at the electric assist motor to charge the battery. As another example, the intake throttle opening may be increased as the waste-gate opening is reduced to adjust intake airflow to compensate for the additional pumping work caused by reduced wastegate opening and meet operator torque demand. In one example, the vehicle controller may send a signal to the waste-gate actuator to move the waste-gate valve towards a more closed position (e.g., a fully closed position) responsive to the increase in battery state of charge. Likewise, the vehicle controller may send a signal to the intake throttle actuator to move the throttle towards a slightly more open position of the throttle responsive to the decrease in waste-gate opening.

While the above example includes waste-gate valve closing and throttle opening, to increase battery state of charge, it will be appreciated that this is not meant to be limiting. In still other examples, the intake throttle may be opened fully when boosting and only the waste-gate may be used for boost control. Further, other actuators such as cams may be operated in conjunction with throttle and waste-gate actuation for boost and torque control. In this way, various actuators may be adjusted to generate the necessary torque required for the driveline plus the recharging of the battery.

Adjusting the vehicle actuators may also include adjusting one or more thresholds for on-board diagnostic (OBD) routines. For example, the controller for the engine may be given a higher boost request than it needs and the energy recuperation action at the electric motor may limit the actual torque/airflow via a reduction in the energy that can be put into the compressor from the turbine. This would then require modifying OBD thresholds so that the controller can recognize that this operation of the electric turbocharger may be limiting the boost (and that the drop in boost is not due to an air path actuator error).

In this way, by operating an electric boosting device in an energy recuperating mode as a vehicle approaches a known regulated zero emissions zone, battery charging can be expedited while reducing the need for opportunistic recovery or heavy engine transients.

Figure 3:
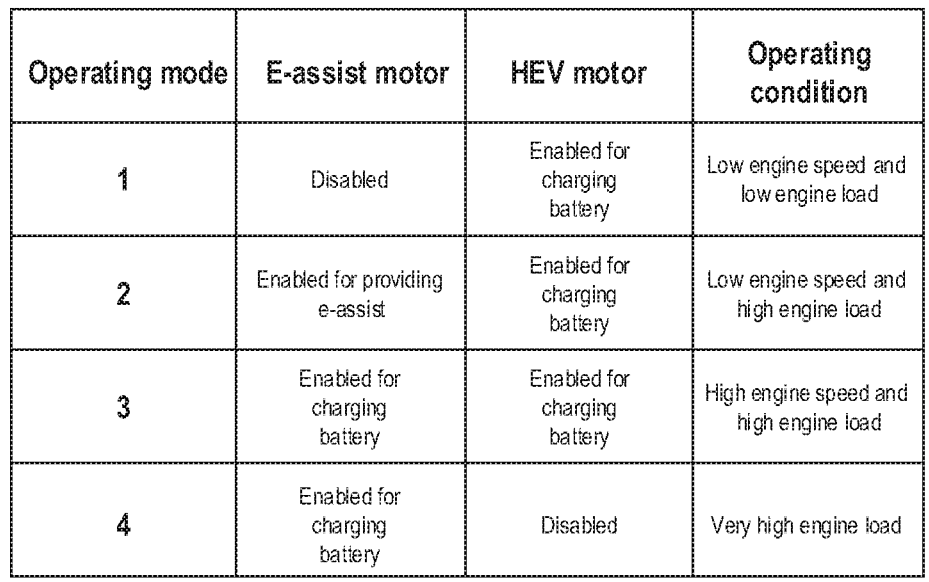
FIG. 3 shows a table listing example operating modes of the boosting system of FIG. 1 that may be used for charging a system battery.

FIG. 3 shows a table 300 depicting example vehicle operating modes wherein a combination of motor torque (positive or negative) from each of an electric assist motor and an HEV motor is used for expedited battery charging, such as when entering or passing through a zero emissions zone. An engine controller may select an operating mode based on various parameters, such as elaborated with reference to the method of FIG. 4. As used herein, the electric assist motor refers to the electric motor coupled to the turbocharger shaft for providing electric assistance to the turbocharger. As used herein, the HEV motor refers to the engine's starter motor (or CISG) or the electric motor coupled to the driveline between the engine and the transmission for propelling the vehicle. It will be appreciated that in each of the modes (modes 1-4) depicted in FIG. 4, the vehicle is operating with the engine on and with at least engine torque being used to propel the vehicle.

It will be appreciated that the modes listed below are not meant to be limiting, and still other modes may be possible. Each of these modes may be for quasi steady-state to slow transient conditions. During rapid transient conditions, the powertrain controller may utilize both motors (that is, the electric motor of the turbocharger and the electric motor of the driveline) in electricity consumption mode for performance.

As an example, the controller may operate the vehicle in a first operating mode (mode 1) wherein the electric assist motor is disabled (that is, no duty cycle is commanded to the electric assist motor) and the HEV motor is enabled (that is, a duty cycle is commanded to the HEV motor controller resulting in a motor torque absorbing command) for battery charging. In this mode, the engine may be operated boosted without electric assistance, such as while providing more engine torque than requested. At the same time, the HEV motor may be operated in the generator mode to recuperate the extra engine torque and use it for charging the battery. In one example, the first operating mode may be selected when the engine is operating with low engine speed and low engine load.

As another example, the controller may operate the vehicle in a second operating mode (mode 2) wherein the electric assist motor is enabled for providing electric assistance and the HEV motor is enabled for battery charging. In this mode, the engine may be operated boosted with electric assistance, such as with the electric motor providing motor torque to supplement the rotation of the turbocharger shaft via the turbine. The electric assistance may enable the overall engine torque output to be increased. At the same time, the HEV motor may be operated in the generator mode to recuperate at least a portion of the engine torque (and/or wheel torque) and use it for charging the battery. In one example, the second operating mode may be selected when the engine is operating with low engine speed and high engine load.

As another example, the controller may operate the vehicle in a third operating mode (mode 3) wherein each of the electric assist motor and the HEV motor are enabled for battery charging. In this mode, the engine may be operating with the electric assist motor acting in a generator mode, absorbing torque to charge the battery. In addition, the HEV motor may be operated in the generator mode to recuperate at least a portion of the engine torque (and/or wheel torque) and use it for charging the battery. In one example, the third operating mode may be selected when the engine is operating with high engine speed and high engine load.

As yet another example, the controller may operate the vehicle in a fourth operating mode (mode 4) wherein the electric assist motor is enabled for battery charging while and the HEV motor is disabled. In this mode, the engine may be operating with the electric assist motor acting in a generator mode, absorbing torque to charge the battery. In one example, the fourth operating mode may be selected when the engine is operating with a very high engine load.

In this way, responsive to anticipated vehicle operation in a low emission zone, a controller may charge a system battery via at least one of a first electric motor coupled to a turbocharger shaft and a second electric motor coupled to a vehicle driveline, the charging of the system battery completed before the vehicle enters the zero emission zone. In one example, the charging may include charging to a threshold state of charge, the threshold state of charge based on a duration and distance of vehicle operation until and within the low emission zone, wherein a rate of charge transfer during charging the system battery via at least one of the first electric motor and the second electric motor is higher than a rate of charge transfer to the battery during regenerative braking. In a further example, while charging the battery, wheel torque based on operator torque demand may be maintained via at least one of the first and the second electric motor. The vehicle controller may further select at least one of the first electric motor and the second electric motor based on each of operator torque demand and engine speed. For example, the selecting may include, while operating in a first low engine speed-load condition, selecting the second electric motor for charging the battery while maintaining wheel torque via the engine with the first motor disabled; while operating in a second low engine speed-high engine load condition, selecting the second electric motor for charging the battery while maintaining wheel torque via the engine with the first motor enabled; while operating in a third high engine speed-load condition, selecting each of the first and the second electric motor for charging the battery while maintaining wheel torque via the engine; and while operating in a fourth high engine speed-load condition, higher than the third high engine speed-load condition, selecting the first electric motor for charging the battery while maintaining wheel torque via the engine with the second electric motor disabled. Further, while operating in the third engine speed-load condition, the controller may adjust a split ratio of motor torque provided by the first electric motor relative to motor torque provided by the second electric motor for charging the battery based on one or more of boost pressure, temperature speed, current, or torque limits of the motors, or other system constraints. Herein the adjusting may include charging the battery with a higher ratio of motor torque from the first electric motor relative to the second electric motor responsive to boost pressure being higher than a threshold pressure, the temperature of the second motor being higher than a desirable threshold, or other driveline or vehicle conditions. In one example, the second electric motor includes one of a crankshaft integrated starter motor and a propulsion motor coupled between an engine and a transmission in the driveline. Additionally, while charging the battery via the first electric motor, the controller may decrease an opening of a waste-gate coupled across an exhaust turbine of the turbocharger, and adjust an opening of an intake throttle coupled downstream of an intake compressor of the turbocharger to produce the desired level of engine torque. For example, the opening of the waste-gate may be decreased further as an amount of charge to be transferred to the battery increases, and wherein the opening of the intake throttle is increased as the opening of the waste-gate is decreased. In still other examples, the controller may apply a blend of one or more of the listed modes, and still other modes not listed herein.

Figure 4:
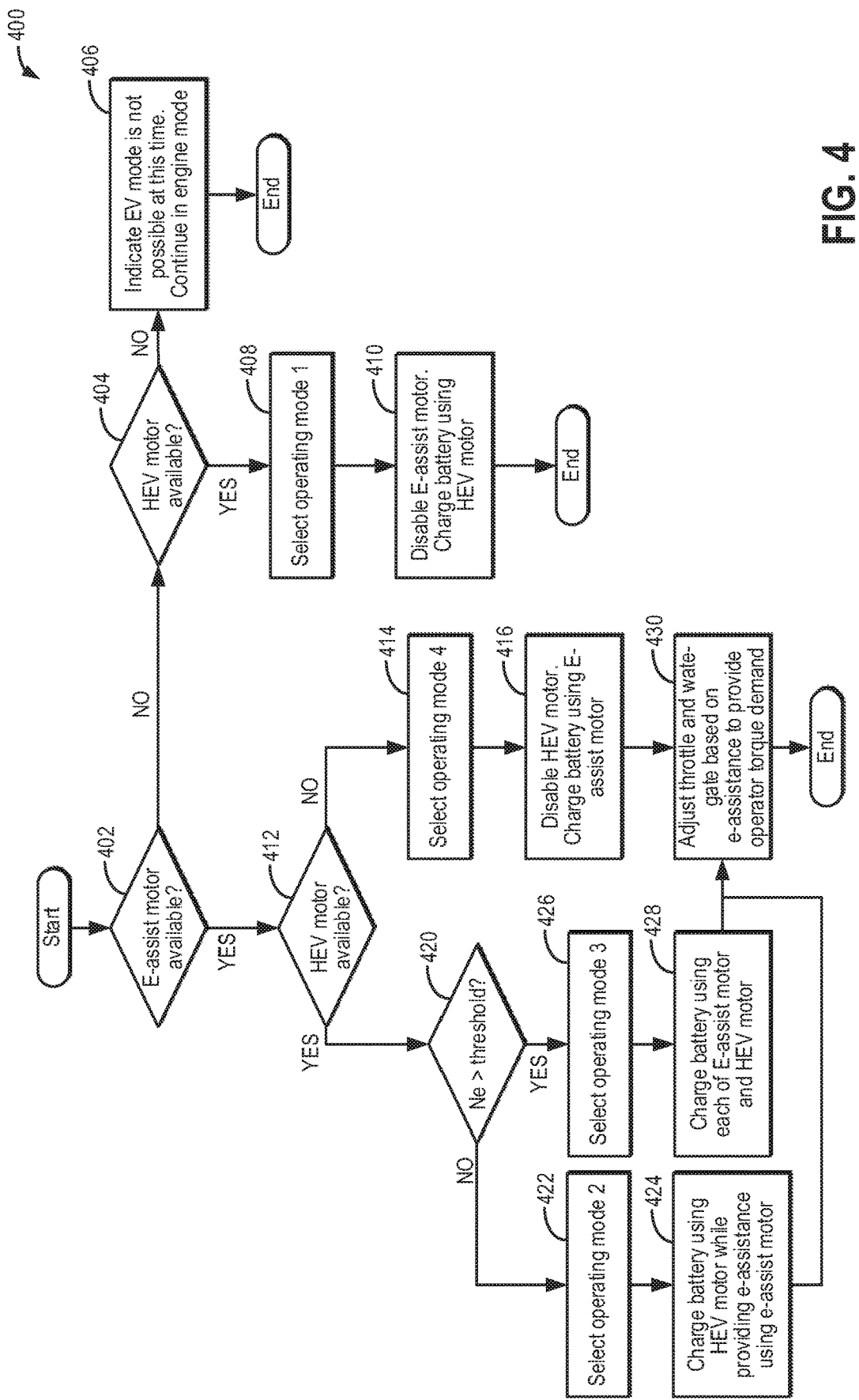
FIG. 4 depicts a high-level flow chart for selecting a boosted engine system operating mode to enable battery charging.
Figure 5:
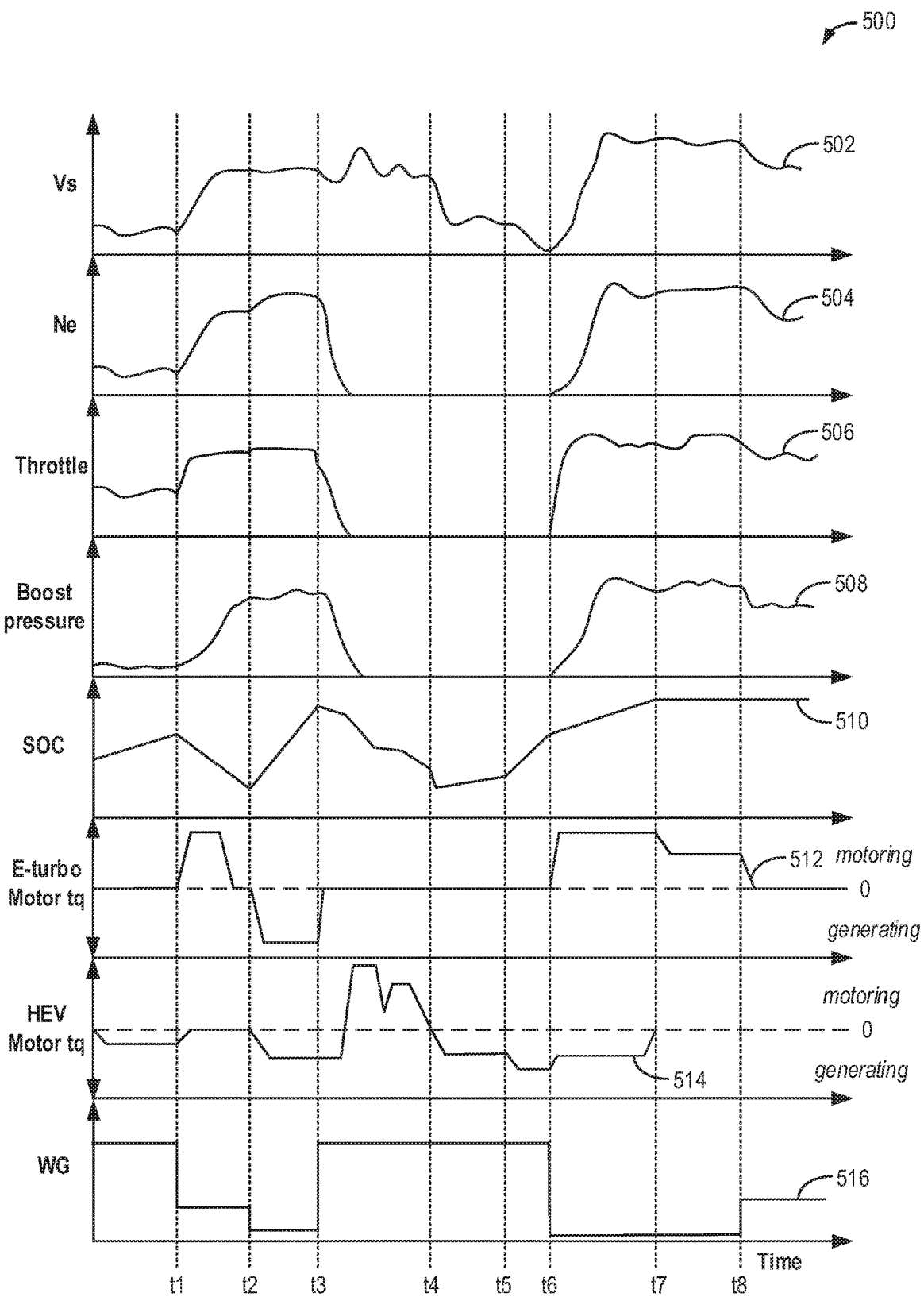
FIG. 5 depicts a prophetic example of battery charging using motor torque from one or more of an electric turbocharger and an HEV motor during vehicle operation through a zero emissions zone.

Turning now to FIG. 4, an example method 400 is shown for selecting an operating mode of a hybrid electric vehicle system so as to enable rapid battery charging prior to entry into a low/zero emissions zone. The controller may select one of the operating modes listed in the table of FIG. 3, for example, based on conditions at each of the motors. By coordinating the operation of each of an electric assist motor of an engine electric boosting device and an electric motor of the hybrid vehicle's driveline, battery charging can be expedited.

At 402, the method includes confirming that the electric assist motor is available for use. In one example, confirming that the electric assist motor is available for use includes confirming that the motor speed of the electric assist motor is not higher than an operational speed limit. The operational speed limit may be based on turbocharger assembly shaft speed. In another example, confirming that the electric assist motor is available for use includes confirming that the temperature of the electric assist motor is not higher than an operational temperature limit. The operational temperature limit may be based on a model of motor temperature using current history, engine load, boost level history and underhood ambient, for example. Various motor faults, or other engine system faults may prevent use of the electric assist motor for regeneration. The limits may be pre-calibrated during engine development or vehicle manufacture or may be calibrated post-manufacture and before delivery of the vehicle to a customer. If the motor speed is higher than the speed limit, or if the motor temperature is higher than the temperature limit, the controller may infer that the electric assist motor is not fully available to provide negative torque to charge the system battery. In another example, the electric assist motor may not be available if the engine is operating at a condition where exhaust gas energy is low, such as at low engine speed-load conditions, when the operator torque demand is low, or when the vehicle or engine is idling.

If the electric assist motor is not available, at 404, the method includes confirming that the HEV motor is available for use. In one example, confirming that the HEV motor is available for use includes confirming that the HEV motor (such as the CISG motor or the driveline motor) does not have any internal faults or diagnostic codes set based on motor controller or circuitry. In another example, confirming that the HEV motor is available for use includes confirming that the temperature of the HEV motor is not higher than an operational temperature limit. The operational temperature limit may be based on motor controller diagnostic limits or model of usage including internal measurements and/or current history. If the motor speed is higher than the speed limit, or if the motor temperature is higher than the temperature limit, the controller may infer that the electric assist motor is not fully available to provide negative torque to charge the system battery.

If neither the electric assist motor nor the HEV motor are available, at 406, the method includes indicating that the electric mode of vehicle operation is not possible at the current time. As a result, the vehicle may continue to be propelled in the engine mode using engine torque. In addition, it may be indicated that battery charging via the motors may not be possible at this time. The routine then exits.

If the electric assist motor is not available but the HEV motor is available, at 408, the method includes selecting a first operating mode (such as mode 1 of FIG. 3). At 410, while operating in the first mode, the method includes disabling the electric assist motor (such as by commanding the motor only to overcome inertia added by the motor on the shaft) and charging the battery via the HEV motor. In this mode, the operator torque demand may be low enough to not require boost pressure, or the boost demand may be low enough that it can be provided via waste-gate valve adjustments and without relying on electric boost assistance. Thus while operating in the first mode, engine torque output may be adjusted to propel the vehicle and charge the battery. Specifically, the engine torque output may be adjusted to exceed the operator torque demand by an amount based on the requested charge transfer. Then, the excess engine torque may be drawn out of the driveline via the HEV motor to charge the battery before entering (or while in) the low emissions zone. The controller may adjust the motor operation (e.g., speed or output) of the HEV motor via adjustments to a command to the HEV motor (such as a duty cycle command), the command based on the amount of charge to be transferred to the battery. For example, the command may be increased as the amount of charge to be transferred increases. In one example, the controller may determine a control signal to send to the controller of the HEV motor based on a difference between the current state of charge (SOC) of the battery and a target SOC required prior to entry into a zero emissions zone, such as elaborated with reference to FIG. 2. The controller may determine the signal based on a calculation using a look-up table with the input being amount of charge transfer required and the output being motor command. As another example, the controller may make a logical determination (e.g., regarding the motor command) by relying on a model or algorithm based on logic rules that are a function of the amount of charge transfer required to travel through the zero emissions zone. The controller may then generate a control signal that is sent to the HEV motor and used to apply negative torque to the driveline during vehicle travel.

Returning to 402, if the electric assist motor is available, at 412, as at 404, the method includes confirming that the HEV motor is available for use. If both the electric assist motor and the HEV motor are available, at 420, the method includes comparing the engine speed to a threshold speed to confirm that the engine speed is higher than the threshold speed. The threshold speed may be a calibrated engine speed that is based on vehicle or engine efficiency models, accessory loads, total charge level, vehicle speed, boost capability and engine load capacity. In another example, the threshold speed corresponds to an engine speed above which engine torque output requires electric assistance due to the boost demand being too high to be met using only waste-gate valve adjustments.

If the engine speed is below the threshold speed, then at 422, the method includes selecting a second operating mode (such as mode 2 of FIG. 3). At 424, while operating in the second mode, the method includes charging the battery via the HEV motor while providing electric assistance for boost pressure control via the electric assist motor. In this mode, the engine speed may not be high enough to meet the torque demand, and therefore the torque demand is met by providing electric boost assistance. Thus while operating in the second mode, engine torque output may be adjusted to propel the vehicle and charge the battery. Specifically, the engine torque output may be adjusted to be a boosted torque output that exceeds the operator torque demand by an amount based on the requested charge transfer. The excess engine torque may or may not be provided by operating the engine boosted with assistance from the electric assist motor (depending on the ability of the e-assist motor to operate at this level continuously). Then, the excess engine torque may be drawn out of the driveline via the HEV motor to charge the battery before entering (or while in) the low emissions zone. It will be appreciated that in the second operating mode, the torque output by the HEV motor in charging the battery is higher than the torque output by the electric assist motor to assist in providing the requested boost pressure. The controller may adjust the control of the HEV motor via a command to the HEV motor controller (such as a speed command, torque command, position command, or a duration of operation command), the command based on the amount of charge to be transferred to the battery. For example, the command may be increased as the amount of charge to be transferred increases. In one example, the controller may determine a control signal to send to the controller of the HEV motor based on a difference between the current state of charge (SOC) of the battery and a target SOC required prior to entry into a zero emissions zone, such as elaborated with reference to FIG. 2. The controller may determine the signal based on a calculation using a look-up table with the input being amount of charge transfer required and the output being motor command. As another example, the controller may make a logical determination (e.g., regarding the command to the motor) by relying on a model or algorithm based on logic rules that are a function of the amount of charge transfer required to travel through the zero emissions zone. The controller may then generate a control signal that is sent to the HEV motor and used to apply negative torque to the driveline during vehicle travel.

If the engine speed is above the threshold speed, then at 426, the method includes selecting a third operating mode (such as mode 3 of FIG. 3). At 428, while operating in the third mode, the method includes charging the battery via each of the electric assist motor and the HEV motor. A split ratio of negative torque drawn via the HEV motor relative to drawn via the electric assist motor for charging the battery may be determined as a function of individual motor conditions. The ratio may be between 0 and 1, not including 0 or 1. For example, responsive to the temperature of electric assist motor being higher than that of the HEV motor, the battery may be charged using more negative torque from the HEV motor relative to the electric assist motor. As another example, responsive to the speed of electric assist motor being higher than that of the HEV motor, the battery may be charged using more negative torque from the HEV motor relative to the electric assist motor. In still other examples, as the boost pressure requirement of the vehicle increases, the battery may be charged using more negative torque from the HEV motor relative to the electric assist motor.

Further still, the ratio may be actively varied by coordinating the motor outputs with a waste-gate valve adjustment. For example, responsive to an operator torque demand, the waste-gate valve may be moved to a more closed position to increase the boosted output of the engine, allowing a larger portion of the battery charge transfer to be provided via the HEV motor while reducing the portion of battery charge transfer provided using the electric assist motor.

While operating in the third mode, engine torque output may be adjusted to propel the vehicle and charge the battery. Specifically, the engine torque output may be adjusted to be an un-boosted torque output that exceeds the operator torque demand by an amount based on the requested charge transfer and split ratio. The excess engine torque may be provided by operating the engine without assistance from the electric assist motor. Then, the excess engine torque may be drawn out of the driveline via the HEV motor. Simultaneously, turbine torque output may be adjusted to an amount that exceeds that required to meet the desired engine torque by an amount based on requested charge transfer and split ratio. The excess turbine torque may be drawn out of the turbocharger shaft via the electric assist motor to charge the battery before entering (or while in) the zero (or low) emissions zone. The controller may adjust the motor speed of each of the electric assist motor and the HEV motor via adjustments to a command respectively commanded to each motor, the command based on the total amount of charge to be transferred to the battery and the split ratio. For example, the commanded to the HEV motor may be increased as the proportion of charge to be transferred via the HEV motor increases. In one example, the controller may determine a control signal to send to the controller of the HEV motor based on a difference between the current state of charge (SOC) of the battery and a target SOC required prior to entry into a zero emissions zone, and further based on the ratio of negative torque to be delivered via the HEV motor. Likewise, the controller may determine a control signal to send to the controller of the electric assist motor based on a difference between the current state of charge (SOC) of the battery and a target SOC required prior to entry into a zero emissions zone, and further based on the ratio of negative torque to be delivered via the electric assist motor The controller may determine the signal based on a calculation using a look-up table with the input being amount of charge transfer required and the output being motor command. As another example, the controller may make a logical determination (e.g., regarding the command to the controller) by relying on a model or algorithm based on logic rules that are a function of the amount of charge transfer required to travel through the zero emissions zone. The controller may then generate a control signal that is sent to the HEV and electric assist motors and used to apply negative torque to the driveline during vehicle travel.

Returning to 412, if the electric assist motor is available but the HEV motor is not available, then at 414, the method includes selecting a fourth operating mode (such as mode 4 of FIG. 3). In one example, the HEV motor may not be available due to an over-temperature condition. At 416, while operating in the fourth mode, the method includes disabling the HEV motor except for opportunistic regenerative braking and charging the battery via only the electric assist motor. In particular, turbine torque in excess of that required to propel the vehicle is generated, the excess torque used to charge the battery. In one example, this may occur when the engine is operating with a high engine load.

While operating in the fourth mode, turbine torque output may be adjusted to propel the vehicle and charge the battery. Specifically, the turbine torque output may be adjusted to be a torque output that exceeds that required to meet the operator torque demand by an amount based on the requested charge transfer. Then, the excess turbine torque may be drawn out of the turbocharger shaft via the electric assist motor to charge the battery before entering the zero emissions zone. The controller may adjust the motor speed of the electric assist motor via adjustments to the motor controller command to the motor based on the total amount of charge to be transferred to the battery. For example, the command to the electric assist motor may be increased as the amount of charge to be transferred via the motor increases. In one example, the controller may determine a control signal to send to the controller of the electric assist motor based on a difference between the current state of charge (SOC) of the battery and a target SOC required prior to entry into a zero emissions zone. The controller may determine the signal based on a calculation using a look-up table with the input being amount of charge transfer required and the output being a necessary motor command (i.e. torque or speed command). As another example, the controller may make a logical determination (e.g., regarding the command to the controller) by relying on a model or algorithm based on logic rules that are a function of the amount of charge transfer required to travel through the zero emissions zone. The controller may then generate a control signal that is sent to the electric assist motor and used to apply negative torque to the turbocharger shaft during vehicle travel.

From each of 416, 424, and 428, the routine moves to 430 where the method includes adjusting one or more engine actuators, such as an intake throttle and an exhaust waste-gate valve opening, based on the electric assistance provided by the electric assist motor to provide the operator demanded torque and maintain vehicle wheel torque based on the operator torque demand. In particular, the actuator adjustments may be determined based on the operating mode selection (such as based on whether the second, third, or fourth mode was selected) and based on which motor is being used to charge the battery. As an example, during conditions when the electric assist motor is being used to charge the battery, the turbine exhaust flow may be increased by reducing an opening of the waste-gate valve, causing more exhaust flow to the turbine and the electric assist motor keeping the speed to the target level by returning excess energy to the battery. To maintain the necessary air flow directed to the engine and thereby maintain wheel torque (from before the reducing the opening of the waste-gate valve), an intake throttle opening may be correspondingly adjusted. Similarly, a more closed waste-gate position and larger throttle position along with other appropriate actuators can be adjusted to make an excess of torque to perform the previous actions while also absorbing the excess torque with the HEV motor to charge the battery.

In this way, an electric turbocharger may be used in an absorbing mode by closing the waste-gate further than necessary for a desired boost level. By using the braking capability (recuperation) of the electric motor on the e-turbocharger assembly to keep the engine from creating too much boost, a battery may be charged before it enters a zero emissions zone.

Turning now to FIG. 5, map 500 depicts example coordinated adjustments between an HEV motor and an electric assist motor to expedite battery charging. Map 500 depicts vehicle speed at plot 502, engine speed at plot 504, intake throttle opening at plot 506, boost pressure at plot 508, and a battery state of charge (SOC) at plot 510. Operation of an electric assist motor coupled to an electric turbocharger (herein also referred to as an e-turbo motor) is shown at plot 512, operation of an HEV motor is shown at plot 514, and waste-gate valve adjustments are shown at plot 516. All plots are depicted over time along the x-axis. Positive torque output represents the corresponding motor operating in a motoring mode, while negative torque output represents the corresponding motor operating in a generating (or absorbing) mode.

Prior to t1, the vehicle is operated in a low torque demand area so the engine is operated at low engine speed and load (plot 504) corresponding to the lower vehicle speed (plot 502). The intake throttle opening (plot 506) is adjusted based on the torque demand. At this time, the electric mode is not used due to a lower battery SOC (plot 510). Thus, before t1, engine torque is propelling the vehicle and charging the battery at a low rate. Required boost pressure is low and can be generated by the hardware base boost, so the waste-gate is fully open (plot 516). In addition, the E-turbo motor is also disabled since no boost pressure is required (plot 512).

At t1, the operator tips in and the torque demand increases to increase the vehicle speed. At this time, boosted engine output is required to meet the torque demand. Accordingly, the waste-gate opening is reduced to spin-up the turbine to spin-up the compressor, and the intake throttle opening is increased to increase air flow to the engine. Due to the elevated torque demand, it is determined that electric assistance is required. Therefore the e-turbo motor is also operated to provide positive motor torque to the intake compressor so as to expedite boost pressure delivery. As a result of operating the e-turbo motor, the battery SOC starts to drop. The e-turbo motor is operated for a short duration since t1 and then disabled once the boost pressure is sufficiently elevated.

At t2, based on navigational input, it is predicted that the vehicle will be entering a zero emissions zone where engine operation is not allowed and the vehicle has to be operated in an electric mode. In particular, entry into the zero emissions zone is predicted at or around t3. Due to the battery SOC being insufficient for the anticipated electric mode of operation, at t2, the battery is charged via each of the e-turbo motor and the HEV motor. Specifically, boost pressure is increased over the operator torque demand required to propel the vehicle at the requested vehicle speed by further reducing the opening of the waste-gate. At the same time, turbine torque is increased over that needed to generate this increased boost by further reducing the opening of the wastegate. At the same time, the e-turbo motor is enabled and operated in a generator mode to use the turbine output in excess of that needed to meet the elevated engine torque demand for charging the battery. At the same time, HEV motor torque is used to charge the battery. A ratio of motor torque from the HEV motor to motor torque from the e-turbo motor is adjusted based on engine speed and load and individual motor conditions. In the depicted example, a larger portion of the charging motor torque is drawn from the e-turbo motor relative to the HEV motor due to the temperature of HEV motor being higher than its optimal level. This results in a gradual increase in battery SOC between t2 and t3 such that by t3, the battery SOC is at a level that is suitable for the predicted electric mode of operation. To compensate for the increased air flow required to the use the HEV motor to charge the battery, the intake throttle opening is slightly increased.

It will be appreciated that herein use of motor torque for propelling the vehicle or providing electric assist is shown via an increase in motor torque (or as positive motor torque) while use of motor torque for charging the battery is shown via a decrease in motor torque (or as negative motor torque relative to the positive motor torque).

At t3, the vehicle enters the zero emissions zone. Engine operation is disabled by closing the intake throttle, fully opening the waste-gate, and disabling the e-turbo motor. The net result is a drop in boost pressure and engine speed. Between t3 and t4, the HEV motor continues to be operated to propel the vehicle, with the motor torque output by the motor to the driveline varying as the operator torque demand varies. The SOC starts to drop accordingly.

At t4, there is a drop in operator torque demand due to the operator tipping out. At this time, the HEV motor is operated as a generator to opportunistically charge the battery using regenerative braking. At t5, there is another drop in operator torque demand due to the operator releasing the accelerator pedal during downhill vehicle travel. The HEV motor is operated as a generator to opportunistically charge the battery using regenerative braking.

At t6, the vehicle is out of the zero emissions zone but the battery SOC is low. In anticipation of another vehicle passage through a zero emissions zone, the battery is charged using the HEV motor. Also at t6, there is a tip-in event causing a rise in operator torque demand. The torque demand is elevated and needs a boosted engine output to be met. Accordingly, at t6, the waste-gate is fully closed to spin up the turbine. In addition, the intake throttle opening is increased to increase intake air flow. At this time, the boosted engine output is higher than the torque demand so that the vehicle can be propelled while the excess engine torque is used to charge the battery via the HEV motor.

At t7, the battery is sufficiently charged but the torque demand is still elevated enough to require boosted engine operation. Therefore at t7, while maintaining the waste-gate fully closed, the e-turbo motor output is reduced to only provide electric assistance for meeting the boost demand. At t8, the operator torque demand reduces and electric assistance is not required for meeting the boost demand. Accordingly, the electric assistance is disabled and the waste-gate opening is increased.

In this way, while propelling a hybrid vehicle using engine torque, a controller may provide an operator demanded torque by adjusting a waste-gate opening while charging a battery using a controlled ratio of motor torque from a first electric motor coupled to a turbocharger shaft and a second electric motor coupled to a vehicle driveline, the waste-gate opening adjusted based on the ratio. The controller may further select the ratio based on the operator torque demand, the ratio of motor torque from the second electric motor increased as the operator torque demand increases. Further, when the operator torque demand increases above a threshold, the controller may charge the battery using negative motor torque from the second electric motor while propelling the vehicle using engine torque in excess of the operator torque demand, the excess engine torque generated while providing positive motor torque from the first electric motor to the turbocharger shaft. In one example, as the ratio of motor torque from the first electric motor increases, the waste-gate opening is reduced beyond a position based on the operator demanded torque. Further, the controller may adjust an intake throttle opening based on each of the waste-gate opening, the operator demanded torque, and the motor torque from the first electric motor, wherein the intake throttle opening is increased as the waste-gate opening is reduced beyond the position based on the operator demanded torque. In one example, the charging is responsive to actual or imminent entry of the hybrid vehicle into a zero emissions zone, wherein the ratio is further selected based on amount and rate of charge transfer to the battery required before entry into the zero emissions zone.

In this way, emissions compliance when travelling through an LEZ may be better ensured. By generating excess turbine torque in anticipation of entering an LEZ and using the excess turbine torque to preemptively charge a system battery via an electric assist motor, passage through the LEZ in an electric mode may be enabled. The technical effect of using the electric assist motor to charge the battery is that is the energy recuperation ability of the motor is better leveraged. In addition, the motor is not left idle during low torque demand conditions. By adjusting a ratio of motor torque drawn from the electric assist motor and a hybrid vehicle driveline electric motor to charge the battery, a target SOC required to passage through the LEZ can be achieved rapidly without causing drivability issues. By also charging the battery using motor torque from the electric assist motor during conditions when an alternator is degraded, nominal battery conditions can be provided during all times of hybrid vehicle operation.

One example method for a hybrid vehicle having a boosted engine comprises: responsive to anticipated vehicle operation in a low emission zone, charging a system battery via at least one of a first electric motor coupled to a turbocharger shaft and a second electric motor coupled to a vehicle driveline, the charging of the system battery completed before the vehicle enters the zero emission zone. In the preceding example, additionally or optionally, the charging includes charging to a threshold state of charge, the threshold state of charge based on a duration and distance of vehicle operation until and within the low emission zone, wherein a rate of charge transfer during charging the system battery via at least one of the first electric motor and the second electric motor is higher than a rate of charge transfer to the battery during regenerative braking. In any or all of the preceding examples, additionally or optionally, the method further comprises, while charging the battery, maintaining wheel torque based on operator torque demand via at least one of the first and the second electric motor. In any or all of the preceding examples, additionally or optionally, the method further comprises selecting at least one of the first electric motor and the second electric motor based on each of operator torque demand and engine speed. In any or all of the preceding examples, additionally or optionally, the selecting includes, while operating in a first low engine speed-load condition, selecting the second electric motor for charging the battery while maintaining wheel torque via the engine with the first motor disabled; while operating in a second low engine speed-high engine load condition, selecting the second electric motor for charging the battery while maintaining wheel torque via the engine with the first motor enabled; while operating in a third high engine speed-load condition, selecting each of the first and the second electric motor for charging the battery while maintaining wheel torque via the engine; and while operating in a fourth high engine speed-load condition, higher than the third high engine speed-load condition, selecting the first electric motor for charging the battery while maintaining wheel torque via the engine with the second electric motor disabled. In any or all of the preceding examples, additionally or optionally, while operation in the third engine speed-load condition, the method includes adjusting a split ratio of motor torque provided by the first electric motor relative to motor torque provided by the second electric motor for charging the battery based on one or more of boost pressure, a temperature of the first motor relative to the second motor, and a motor speed of the first motor relative to the second motor. In any or all of the preceding examples, additionally or optionally, the adjusting includes charging the battery with a higher ratio of motor torque from the first electric motor relative to the second electric motor responsive to boost pressure being higher than a threshold pressure, the temperature of the second motor being higher than the temperature of the first motor, or the motor speed of the second motor being higher than the motor speed of the first motor. In any or all of the preceding examples, additionally or optionally, the second electric motor includes one of a crankshaft integrated starter motor and a propulsion motor coupled between an engine and a transmission in the driveline. In any or all of the preceding examples, additionally or optionally, the method further comprises, while charging the battery via the first electric motor, decreasing an opening of a waste-gate coupled across an exhaust turbine of the turbocharger, and adjusting an opening of an intake throttle coupled downstream of an intake compressor of the turbocharger. In any or all of the preceding examples, additionally or optionally, the opening of the waste-gate is decreased further as an amount of charge to be transferred to the battery increases, and wherein the opening of the intake throttle is increased as the opening of the waste-gate is decreased.

Another example method comprises, while propelling a hybrid vehicle using engine torque, providing an operator demanded torque by adjusting a waste-gate opening while charging a battery using a controlled ratio of motor torque from a first electric motor coupled to a turbocharger shaft and a second electric motor coupled to a vehicle driveline, the waste-gate opening adjusted based on the ratio. In the preceding example, additionally or optionally, the method further comprises selecting the ratio based on the operator torque demand, the ratio of motor torque from the second electric motor increased as the operator torque demand increases. In any or all of the preceding examples, additionally or optionally, the method further comprises, when the operator torque demand increases above a threshold, charging the battery using negative motor torque from the second electric motor while propelling the vehicle using engine torque in excess of the operator torque demand, the excess engine torque generated while providing positive motor torque from the first electric motor to the turbocharger shaft. In any or all of the preceding examples, additionally or optionally, as the ratio of motor torque from the first electric motor increases, the waste-gate opening is reduced beyond a position based on the operator demanded torque. In any or all of the preceding examples, additionally or optionally, the method further comprises adjusting an intake throttle opening based on each of the waste-gate opening, the operator demanded torque, and the motor torque from the first electric motor, wherein the intake throttle opening is reduced as the waste-gate opening is reduced beyond the position based on the operator demanded torque. In any or all of the preceding examples, additionally or optionally, the charging is responsive to actual or imminent entry of the hybrid vehicle into a zero emissions zone, and wherein the ratio is further selected based on amount and rate of charge transfer to the battery required before entry into the zero emissions zone.

Another example hybrid vehicle system comprises: an engine; a turbocharger coupled to an engine intake, the turbocharger including an intake compressor coupled to an exhaust turbine via a shaft, and a first electric motor coupled to the shaft for providing electric assistance to the turbocharger; a second electric motor coupled to a vehicle driveline between the engine and a transmission; a waste-gate including a waste-gate actuator coupled across the exhaust turbine of the turbocharger; an intake throttle coupled to the engine intake; a system battery coupled to each of the first and the second electric motor; a navigational system; and a controller with computer readable instructions stored on non-transitory memory for: responsive to input from the navigational system, operating the vehicle system in a first charging mode with the first electric motor disabled and with the battery charged using motor torque drawn from the second electric motor; operating the vehicle system in a second charging mode with the first electric motor providing motor torque to the turbocharger and with the battery charged using motor torque drawn from the second electric motor; operating the vehicle system in a third charging mode with the battery charged using motor torque drawn from each of the first and the second electric motor; operating the vehicle system in a fourth charging mode with the second electric motor disabled and the battery charged using motor torque drawn from the first electric motor; and selecting a charging mode based on operator torque demand and the input from the navigational system. In the preceding example, additionally or optionally, the input from the navigational system includes an amount of charge transfer to the battery required for vehicle travel through an upcoming zero emissions zone, the vehicle propelled without engine torque through the upcoming zero emissions zone. In any or all of the preceding examples, additionally or optionally, the selecting includes selecting the first charging mode when engine speed is lower than a threshold speed and engine load is lower than a threshold load; selecting the second charging mode when engine speed is lower than the threshold speed and engine load is lower than the threshold load; selecting the third charging mode when engine speed is higher than the threshold speed and engine load is higher than the threshold load by a first amount; and selecting the fourth charging mode when engine load is higher than the threshold load by a second amount, larger than the first amount. In any or all of the preceding examples, additionally or optionally, while operating in any of the first, second, third, and fourth charging modes, the vehicle is propelled using engine torque, and wherein the controller includes further instructions for reducing an opening of the waste-gate actuator further when the battery is charged using motor torque drawn from the first electric motor relative to when the first electric motor is providing motor torque to the turbocharger; and reducing an opening of the intake throttle responsive to the reducing the opening of the waste-gate actuator.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
while propelling a hybrid vehicle using engine torque, based on input from a navigation system, responsive to actual or imminent entry of the hybrid vehicle into a low emissions geographic zone where vehicle propulsion using engine operation is not allowed and the hybrid vehicle is required to be operated in an electric mode,
providing an operator demanded torque by generating increased engine torque greater than the operator demanded torque to charge a battery while adjusting each of a turbocharger waste-gate opening, an amount of motor torque from a first electric motor coupled to a turbocharger shaft, and an amount of motor torque of a second electric motor coupled to a vehicle driveline, wherein at decreased engine speeds below a threshold, the first electric motor is operated to provide positive motor torque to the turbocharger shaft.

2. The method of claim 1, further comprising selecting a ratio of motor torque of the first electric motor and second electric motor based on the operator demanded torque, the ratio of motor torque from the second electric motor increased as the operator demanded torque increases.

3. The method of claim 2, further comprising, when the operator demanded torque increases above a threshold, charging the battery using negative motor torque from the second electric motor while propelling the vehicle using engine torque in excess of the operator demanded torque, the excess engine torque generated while providing positive motor torque from the first electric motor to the turbocharger shaft.

4. The method of claim 2, wherein, as the ratio of motor torque from the first electric motor increases, the turbocharger waste-gate opening is reduced beyond a position based on the operator demanded torque.

5. The method of claim 2, further comprising adjusting an intake throttle opening based on each of the turbocharger waste-gate opening, the operator demanded torque, and the amount of motor torque from the first electric motor.

6. The method of claim 2, wherein the ratio of motor torque is further selected based on an amount and a rate of charge transfer to the battery required before entry into the low emissions geographic zone.

7. The method of claim 6, wherein charging includes a threshold state of charge, the threshold state of charge based on a duration and a distance of vehicle operation until and within the low emissions geographic zone, wherein a rate of charge transfer during charging the battery via the first electric motor and the second electric motor is higher than a rate of charge transfer to the battery during regenerative braking.

8. The method of claim 2, wherein at increased engine speeds above the threshold, the first electric motor is operated to provide negative motor torque to the turbocharger shaft.

9. The method of claim 8, further including:
while operating in a low engine speed-load condition, selecting the second electric motor for charging the battery while maintaining wheel torque via an engine with the first electric motor disabled;
while operating in a first high engine speed-load condition, selecting each of the first and the second electric motors for charging the battery while maintaining wheel torque via the engine; and
while operating in a second high engine speed-load condition, higher than the first high engine speed-load condition, selecting the first electric motor for charging the battery while maintaining wheel torque via the engine with the second electric motor disabled.

10. The method of claim 9, further comprising, while operating in the first high engine speed-load condition, adjusting a split ratio of motor torque provided by the first electric motor relative to motor torque provided by the second electric motor for charging the battery based on one or more of boost pressure, a temperature of the first electric motor and the second electric motor relative to corresponding temperature thresholds, and a motor speed of the first electric motor and the second electric motor relative to corresponding speed thresholds.

11. A method, comprising:
while propelling a hybrid vehicle using engine torque, responsive to actual or imminent entry of the hybrid vehicle into a low emissions zone where vehicle propulsion using engine operation is not allowed and the hybrid vehicle is required to be operated in an electric mode,
providing an operator demanded torque by adjusting a waste-gate opening while charging a battery using a controlled ratio of motor torque from a first electric motor coupled to a turbocharger shaft and a second electric motor coupled to a vehicle driveline, wherein the ratio of motor torque is further selected based on an amount and a rate of charge transfer to the battery required before entry into the low emissions zone.

12. The method of claim 11, further comprising selecting the ratio of motor torque based on the operator demanded torque, the ratio of motor torque from the second electric motor increased as the operator demanded torque increases.

13. The method of claim 12, further comprising, when the operator demanded torque increases above a threshold, charging the battery using negative motor torque from the second electric motor while propelling the vehicle using engine torque in excess of the operator demanded torque, the excess engine torque generated while providing positive motor torque from the first electric motor to the turbocharger shaft.

14. The method of claim 12, wherein, as the ratio of motor torque from the first electric motor increases, the waste-gate opening is reduced beyond a position based on the operator demanded torque.

15. The method of claim 12, further comprising adjusting an intake throttle opening based on each of the waste-gate opening, the operator demanded torque, and the motor torque from the first electric motor.

16. A method, comprising:
  while propelling a hybrid vehicle using engine torque, based on input from a navigation system, responsive to actual or imminent entry of the hybrid vehicle into a low emissions geographic zone where vehicle propulsion using engine operation is not allowed and the hybrid vehicle is required to be operated in an electric mode,
  providing an operator demanded torque by adjusting a waste-gate opening while charging a battery using a controlled ratio of motor torque from a first electric motor coupled to a turbocharger shaft and a second electric motor coupled to a vehicle driveline, wherein charging includes a threshold state of charge, the threshold state of charge based on a duration and a distance of vehicle operation until and within the low emissions geographic zone, wherein a rate of charge transfer during charging the battery via the first electric motor and the second electric motor is higher than a rate of charge transfer to the battery during regenerative braking.

17. The method of claim 16, further comprising selecting the ratio of motor torque based on engine speed.

18. The method of claim 17, wherein the selecting includes:
  while operating in a low engine speed-load condition, selecting the second electric motor for charging the battery while maintaining wheel torque via an engine with the first electric motor disabled;
  while operating in a first high engine speed-load condition, selecting each of the first and the second electric motors for charging the battery while maintaining wheel torque via the engine; and
  while operating in a second high engine speed-load condition, higher than the first high engine speed-load condition, selecting the first electric motor for charging the battery while maintaining wheel torque via the engine with the second electric motor disabled.

19. The method of claim 18, further comprising, while operating in the first high engine speed-load condition, adjusting a split ratio of motor torque provided by the first electric motor relative to motor torque provided by the second electric motor for charging the battery based on one or more of boost pressure, a temperature of the first electric motor and the second electric motor relative to corresponding temperature thresholds, and a motor speed of the first electric motor and the second electric motor relative to corresponding speed thresholds.

* * * * *